3,031,496
VINYL ACETATE PROCESS
Abe Warshaw, Linden, N.J., assignor to Chemical Construction Corporation, New York, N.Y., a corporation of Delaware
No Drawing. Filed May 13, 1959, Ser. No. 812,803
4 Claims. (Cl. 260—498)

This invention relates to the synthesis of vinyl esters of carboxylic acids from the appropriate acids and acetylene. It is especially directed to the synthesis of vinyl acetate from acetic acid and acetylene. The invention consists of new and more effective catalysts for this and similar reactions, comprising silicofluorides of zinc and cadmium. In the preferred embodiment, zinc silicofluoride is employed, and is deposited on and within activated carbon, which acts as a carrier.

A well-known commercial process for the synthesis of vinyl acetate consists of passing a gaseous mixture of acetylene and acetic acid through a reactor containing a catalyst bed consisting of zinc or cadmium acetate supported or deposited on activated carbon. The reactants combine in equimolar proportions to yield vinyl acetate. Although this process is in commercial usage, it is open to certain objections. The catalyst, being an organic salt, does not provide operating cycles of long duration. This is because, at the elevated reaction temperatures, the salt has a tendency to vaporize and sublime, and thus leave the carrier and deposit at some cooler downstream point in the process. In addition, the catalyst has a tendency to decompose and release volatile breakdown products such as ketones.

It is an object of this invention to provide a catalyst for the synthesis of vinyl acetate from acetylene and acetic acid which has improved properties as compared to catalysts employed in the prior art.

An additional object is to provide a catalyst which more effectively promotes and catalyzes the reaction between acetylene and acetic acid to form vinyl acetate.

Other aims and objects of this invention will become apparent from the discussion which follows.

The present invention consists of the utilization of zinc and cadmium silicofluoride or mixture thereof as an effective catalytic agent for the reaction. It has been determined that these compounds exhibit definite advantages as compared to catalytic agents known in the prior art. The method of usage of the catalyst is similar to methods employed in the aforementioned prior art. The silicofluoride is deposited on and within a carrier such as activated carbon by methods which are well-recognized in the art. The catalyst is then placed in a reaction vessel in the form of a bed, and the mixed acetylene-acetic acid gas stream is passed through the bed at suitable temperatures. Surprisingly high conversion to vinyl acetate thereby results.

The loss in activity of catalysts in current usage has been attributed somewhat to contamination by polymeric substances formed in the catalyst by the acetylene and acetic acid reactants. The higher the operating temperatures, the sooner the catalyst deteriorates and must be discarded. When using a fresh catalyst charge in present commercial plants, the reactants must be preheated to at least 170° C. for acceptable conversion. As the catalyst ages, the temperature must be raised continuously to maintain conversion rates. Final operating temperatures will reach 230–250° C., after which the catalyst is removed and replaced with a fresh charge.

It has been found that high conversion rates are attained at temperatures at least 10° lower by use of the silicofluoride catalyst of this invention. Moreover, polymeric substances are not as readily formed and consequently the silicofluoride catalyst has a much greater useful life. Most important, it has been found that under comparable conditions, higher conversion rates are obtained using a silicofluoride catalyst. Furthermore, these higher conversion rates were obtained using substantially higher space velocities than with a commercial zinc acetate catalyst tested for comparison. Finally, silicofluoride catalyst is more rugged and less subject to decomposition or volatilization than other catalysts such as zinc acetate.

An example of the preparation and usage of the catalyst will now be given together with data comparing the effectiveness of the catalyst with commercial zinc acetate catalyst. A second data table indicatees the comparative effectiveness of the various silicofluorides.

EXAMPLE

The catalyst was prepared by dissolving 164 grams of zinc silicofluoride technical grade, in 200 milliliters of distilled water. The zinc silicofluoride used was that commercially available as the hydrated salt $$ZnSiF_6 \cdot 6H_2O$$

Then 200 grams of a commercial activated carbon was added to the aqueous solution. This mixture was allowed to stand 24 hours in a covered porcelain dish. The supernatant liquor was decanted and the catalyst dried at 166° C. for 72 hours. It was then ready for use as a catalyst for the synthesis of vinyl acetate.

It should be noted that other techniques may be employed in preparing the catalyst of this invention. Zinc silicofluoride and cadmium silicofluoride may be made by reacting the respective carbonates or oxides with hydrofluosilicic acid. Carriers other than activated carbon, such as activated alumina, activated silica, devolatilized bituminous coal or others may be used. Impregnation of the carrier may be made by simple soaking or by subjecting the carrier to high vacuum before impregnation with the solution of zinc silicofluoride. It is also within the scope of the present invention to use the silicofluorides recited in these processes unsupported by carriers. As far as installation is concerned, the catalyst may be installed in either vertical or horizontal reactors. No variation from the accepted methods of feeding the reactants to the reactors is proposed.

The following is test data which shows the superiority of the zinc silicofluoride catalyst in vinyl acetate synthesis, as compared to commercial zinc acetate catalyst. In carrying out the tests, 100 ml. of respective catalysts were placed in a tubular reactor, said reactor being externally heated to the required temperatures. Approximately equal volumes of acetylene and acetic acid vapor were forced through the heated catalyst with the following results:

|  | Run #1 | | Run #2 | |
|---|---|---|---|---|
|  | Zinc Acetate | Zinc Silicofluoride | Zinc Acetate | Zinc Silicofluoride |
| Operating Temp., ° C | 208 | 194 | 220 | 194 |
| Space Velocity mls. of gas/hr./ml. of catalyst | 785 | 920 | 920 | 1270 |
| Percent Conversion | 71.3 | 99.5 | 76.5 | 89.6 |

The zinc silicofluoride catalyst provides greater % conversions at higher space velocities (more throughput), with lower temperatures.

The following is data showing the comparative effectiveness of the various silicofluorides as catalysts for vinyl acetate synthesis. Although zinc silicofluoride has been found to possess superior activity and is preferred, cadmium silicofluoride also has been found to have a greater activity than other known catalysts in the preparation of vinyl acetate.

Synthesis of Vinyl Acetate

|  | Zinc Silico-fluoride | Cadmium Silico-fluoride |
|---|---|---|
| Operating Temp., °C | 194 | 185 |
| Space Velocity | 1270 | 1270 |
| Percent Conversion | 89.6 | 86.3 |

Furthermore, although the silicofluoride catalyst as prepared above is particularly suited for the vapor phase synthesis of vinyl acetate, the catalyst is generally applicable to other types of reactions involving acetylene such as with acids, aldehydes, alcohols, and other processes where vinyl compounds are formed.

I claim:
1. A process for the synthesis of vinyl acetate which comprises reacting acetylene with acetic acid in contact with a catalyst comprising at least one silicofluoride selected from the group consisting of zinc and cadmium silicofluoride, deposited on a suitable carrier.
2. A process for the synthesis of vinyl acetate which comprises passing a gaseous mixture of acetylene and acetic acid at an elevated temperature in contact with a catalyst comprising at least one silicofluoride selected from the group consisting of zinc and cadmium silicofluoride, deposited on a suitable carrier.
3. A process which comprises reacting acetylene with acetic acid to produce vinyl acetate by passing a gas mixture containing acetylene and acetic acid at a temperature above 170° C. in contact with a catalyst prepared by adding a solid selected from the group consisting of activated carbon, activated alumina, activated silica and devolatilized bituminous coal to a liquid solution of at least one silicofluoride selected from the group consisting of zinc and cadmium, allowing the solid to soak and absorb the liquid solution, decanting the supernatant liquid and drying the impregnated solid.
4. The process as described in claim 3, in which the solid selected from the group consisting of activated carbon, activated alumina, activated silica and devolatilized bituminous coal is subjected to high vacuum before being added to the silicofluoride solution.

References Cited in the file of this patent
UNITED STATES PATENTS

| 2,521,113 | Braconier et al. | Sept. 5, 1950 |
| 2,524,771 | Darling | Oct. 10, 1950 |
| 2,750,410 | Hanszen et al. | June 12, 1956 |
| 2,770,650 | Stanton | Nov. 13, 1956 |
| 2,794,827 | Stanton et al. | June 4, 1957 |
| 2,913,421 | Horne et al. | Nov. 17, 1959 |

OTHER REFERENCES

Grassmann et al.: Chem. Abstracts 47, 11635 (1953).
Bernhard: Chem. Abstracts 47, 11755–11756 (1953).
Rose: "The Condensed Chemical Dictionary," Reinhold Pub. Corp., 1956, page 1193.